Dec. 12, 1967 T. C. GABRIELSON 3,357,726
CLAMPING DEVICE
Filed Nov. 10, 1966
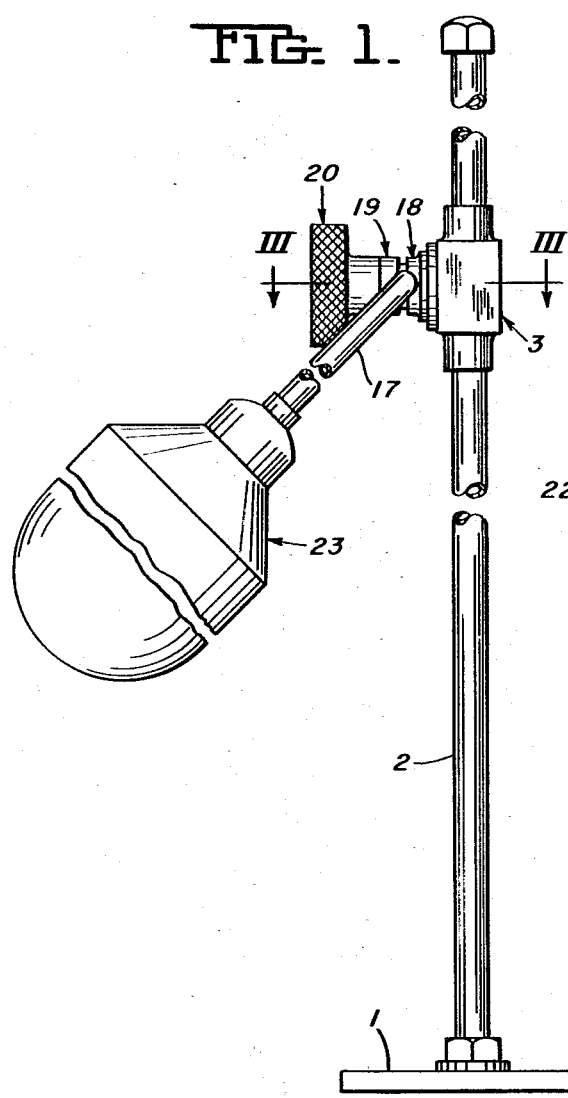
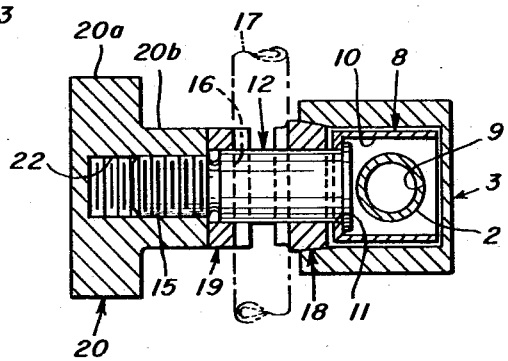
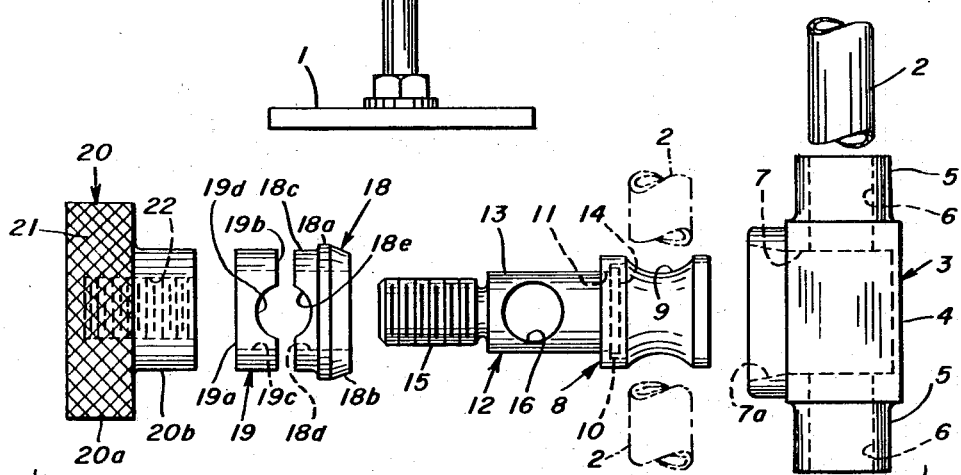
INVENTOR.
THEODORE C. GABRIELSON
By Christy, Parmelee & Strickland
Attorneys

3,357,726
CLAMPING DEVICE
Theodore C. Gabrielson, 444 Parkridge Drive,
Pittsburgh, Pa. 15235
Filed Nov. 10, 1966, Ser. No. 593,462
2 Claims. (Cl. 287—14)

ABSTRACT OF THE DISCLOSURE

The invention relates to an adjustable clamp, under the control of a single control knob, for selectively maintaining a first member in adjustable relation to a second member upon which the clamp is mounted.

---

The present invention relates to clamping devices for connecting together two angularly disposed members under the control of a single rotatable member, whereby upon selective movement of the rotatable member the two angularly disposed members may be released for movement relative to each other or locked together in a desired angular relation.

One object of the invention is to provide a clamp assembly of the character described wherein a single rotatable member controls relative movement between all portions and the clamp and between the two members engaged by the clamp.

These and other objects of the invention will be made apparent from the following description and the drawing forming a part thereof wherein:

FIG. 1 shows the clamp assembly slidably mounted upon a vertically extending first member and rotatably supporting a second member for movement relative to said first member.

FIG. 2 shows an exploded view of the clamp assembly apart from the vertically extending first member and said second member.

FIG. 3 shows an enlarged cross-section taken on lines III—III of FIG. 1.

Referring now in detail to the drawing, reference numeral 1 indicates any suitable form of a base member having secured thereto and extending upwardly therefrom a fixed clamp attaching member 2 which may be of circular or of other uniform cross section. Slidably mounted upon member 2 is a housing member indicated generally at 3, comprising a body portion 4 having top and bottom embossments 5 provided with axially aligned openings 6 therethrough for slidably receiving member 2. Body portion 4 of member 3 is provided with a counter-bore 7 disposed at right angles to openings 6 to receive a cylindrical spindle receiving member 8 having an opening 9, therethrough aligned with openings 6 to slidably receive member 2. Counter-bore 7, of member 4, is provided with outwardly diverging faces 7a for reception of a clamping member 18, hereinafter discussed. Member 8 is provided with an axial counter-bore 10, for a portion of its length and at right angles to the opening 9, which counter-bore is connected through the adjacent face of member 8 by a smaller diameter opening 11.

A spindle member 12 having a cylindrical shank portion 13 terminating at one end in an enlarged head portion 14 is inserted through counter-bore 10 and opening 11 of member 8. The spindle 12 is retained in engagement with member 8 by engagement between enlarged spindle head portion 14 and the adjacent face of smaller opening 11. The opposite end 15 of spindle member 12 is preferably of reduced diameter and is threaded as shown in FIG. 2. Extending transversely through spindle shank portion 13 and adjacent the spindle threaded portion 15 is a suitable aperture 16 for slidably receiving a member 17 for rotary and sliding movement relative to member 2.

Slidably received over the spindle 12 cylindrical shank portion 13 are two clamping members 18 and 19. The inner member 18 has an annular shoulder portion 18a provided with converging surfaces 18b to be received within faces 7a of housing member 3. Extending outwardly from shoulder portion 18a is annular flange 18c. A central opening 18d of member 18 is received over shank portion 13 of spindle member 12. Flange 18c has a semi-circular opening 18e therethrough at right angle to central opening 18d for engagement with member 17.

Clamping member 19 is in the form of a flat washer having a substantial planar face 19a, a face 19b and a central opening 19c for reception of shank portion 13 of spindle member 12. Face 19b has a semi-circular recess 19d therethrough for engagement with member 17.

An adjustment knob 20, has an annular head portion 20a preferably provided with a knurled peripheral surface 21, and a lateral extension 20b having a threaded counter-bore 22 to receive the threaded portion 15 of spindle member 12.

Member 17, mounted for rotary and transverse sliding movement relative to member 2, may be an arm for supporting a suitable lamp member and shade 23, an indexing arm or scribe as used in the tool making and machining art or any other form of member to be mounted for selective rotary and sliding movement relative to member 2. It will be understood that whenever member 17 supports a lamp and shade 23, as shown in FIG. 1, member 17 will be hollow in order to receive a suitable extension cord (not shown) for connection with a suitable source of electric energy for lighting the lamp.

Referring now to FIGS. 1 to 3 of the drawings, the member 2 is provided with a threaded bottom portion for engagement with a threaded opening in base 1. The spindle 12 is assembled with member 8, as shown in FIG. 3, and member 8 is inserted into member 3 with opening 9 of member 8 aligned with openings 6 of member 3 and this assembly is mounted over the free end of member 2. Thereafter a cap member 2a may be assembled upon member 2. Clamp member 18 is assembled over the threaded end of spindle 12 with sloping surfaces 18b engaged with sloping surfaces 7b of member 3. Rod 17 is inserted through opening 16 of spindle 12, the clamp member 19 is inserted over spindle 12 and the adjustment knob 20 is threaded over spindle portion 15 to engage members 18 and 19 with member 17.

Tightening knob 20 places rod 17 in compression between clamping members 18 and 19 to hold the rod in fixed relation to spindle 12. Tightening knob 20 also advances sloping surfaces 18b of member 8 into engagement with sloping surfaces 7a of housing 4, thereby placing spindle 12 and member 8 in tension against vertical member 2, preventing movement of housing member 4 longitudinally of member 2. Reverse rotation of knob 20 reduces tension in spindle 12 and member 8 relative to vertical member 2 permitting the housing 3 to be freely moved longitudinally of member 2. In a similar manner such reverse rotation of knob 20 releases compression of members 18 and 19 upon member 17, permitting the latter member and spindle 12 to be rotated relative to member 2 or member 17 to be slid transversely of spindle 12 for any desired positioning of the lamp or other tool on member 17 relative to vertical member 2.

It will be understood that the invention herein disclosed may be embodied in many different forms of devices and its construction and mode of operation may be varied without departing from the scope of the appended claims.

I claim:
1. A clamp assembly for selectively maintaining a first member (17) in selective rotary and longitudinal relation to a second member, comprising
   (a) a housing member having a hollow cylindrical interior with an opening through a front wall thereof and aligned openings in the top and bottom walls thereof for reception of said second named member, said front wall opening being defined by a reduced embossment having outwardly diverging inner peripheral walls contiguous with said cylindrical interior, and said aligned openings in the top and bottom walls also being defined by axially extending reduced cylindrical embossments providing additional support for said second member,
   (b) a hollow cylindrical member disposed within the interior of said housing member inwardly of the outwardly diverging walls of the embossment thereon and having an annular opening therethrough in alignment with the said aligned openings in said housing member for receiving said second named member,
   (c) spindle means etxending longitudinally through said hollow cylindrical member and having a head portion engaging a reduced portion of said member for rotary movement relative thereto and a shank portion extending outwardly through the cylindrical member reduced end portion,
   (d) a transverse opening through said spindle shank portion, in spaced relation to the said head portion thereof for reception of said first member and a threaded end portion outwardly of said spindle shank portion opening,
   (e) a first clamp member mounted on said spindle shank portion, inwardly of the transverse opening therethrough, having an enlarged annular rearwardly extending converging outer peripheral portion for matching engagement with said housing member embossment outwardly diverging inner peripheral walls and a forwardly extending recessed portion for embracing a portion of the periphery of said first member extending through said spindle shank portion,
   (f) a second clamp member mounted on said spindle shank portion, outwardly of the opening therethrough, having an annular front face disposed towards said spindle threaded portion and a recessed rear face for embracing a portion of the adjacent periphery of said first member extending through the spindle shank opening,
   (g) an internally threaded adjustment knob mounted upon said spindle shank threaded portion for selective abutment with said second clamp member front face for clamping said first member in fixed relation to said spindle between said first and second clamp members.

2. The clamp assembly as defined in claim 1 wherein said adjustment knob when initially tightened seats the clamping member within said housing member converging walls and tensions housing member on the member extending therethrough, retaining said housing member in place on said vertical member received therethrough.

References Cited
UNITED STATES PATENTS
| | | | |
|---|---|---|---|
| 1,137,333 | 4/1915 | Klorer | 287—14 X |
| 1,604,870 | 10/1926 | Asman | 287—14 |
| 2,310,276 | 2/1943 | Bilz | 287—14 |

FOREIGN PATENTS
| | | |
|---|---|---|
| 125,512 | 4/1919 | Great Britain. |

CARL W. TOMLIN, *Primary Examiner.*

A. V. KUNDRAT, *Assistant Examiner.*